A. JOHNSON AND O. LANDHOLM.
NONSKID AND TRACTION DEVICE.
APPLICATION FILED MAY 19, 1921.

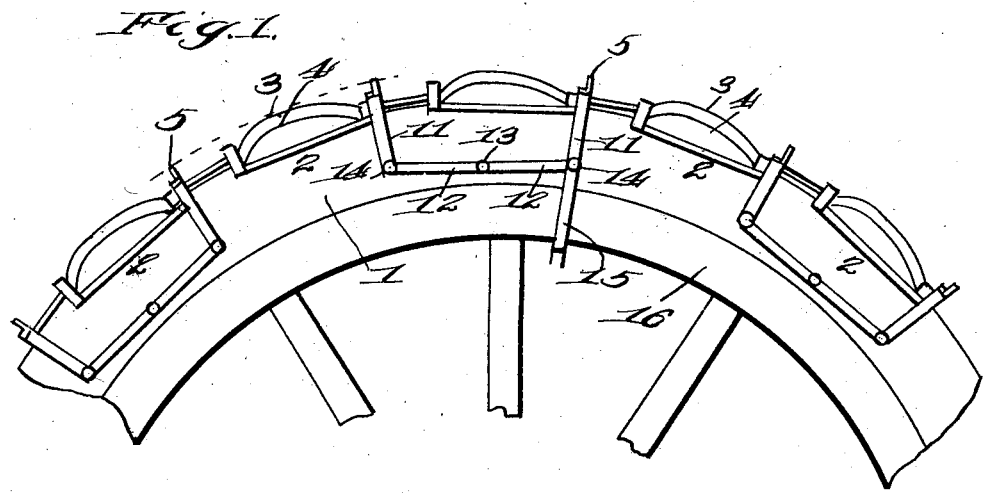
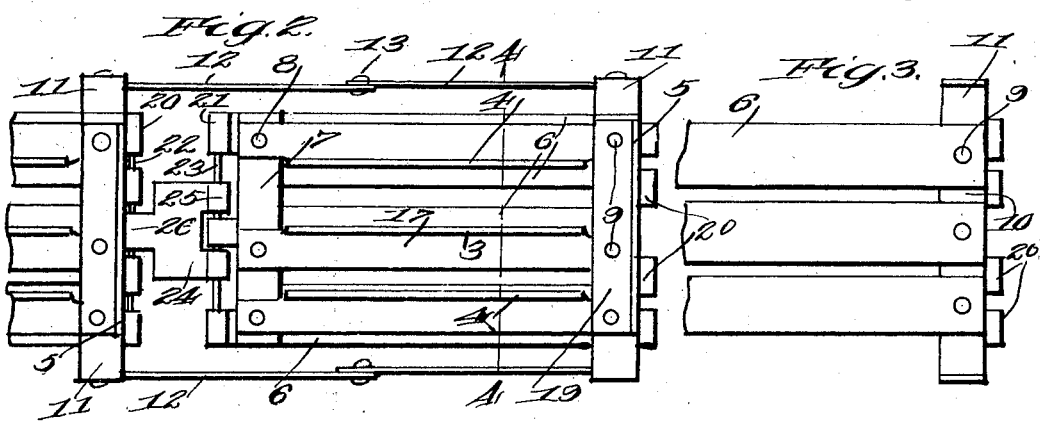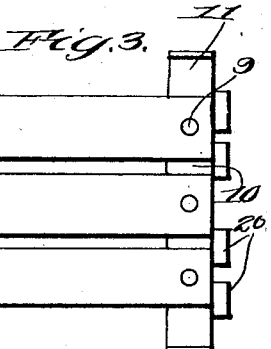
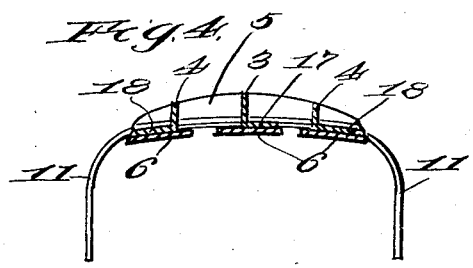

1,408,004.

Patented Feb. 28, 1922.
2 SHEETS—SHEET 2.

Inventors
August Johnson
Oscar Landholm
By Carl B. Crawford
Attorney

UNITED STATES PATENT OFFICE.

AUGUST JOHNSON, OF DEEP CREEK, WASHINGTON, AND OSCAR LANDHOLM, OF WALLACE, IDAHO.

NONSKID AND TRACTION DEVICE.

1,408,004. Specification of Letters Patent. Patented Feb. 28, 1922.

Application filed May 19, 1921. Serial No. 470,800.

*To all whom it may concern:*

Be it known that we, AUGUST JOHNSON and OSCAR LANDHOLM, citizens of the United States, residing at Deep Creek, in the county of Spokane and State of Washington, and in Wallace, in the county of Shoshone and State of Idaho, respectively, have invented new and useful Improvements in a Nonskid and Traction Device, of which the following is a specification.

This invention relates to improvements in anti-skid and traction devices for vehicle wheels.

It is one of the objects of this invention to provide a device of this character composed of a plurality of transversely curved or arched tread sections each having one or more non-skid flanges extending longitudinally thereof and a single traction flange extending transversely along one end thereof.

It is a feature of this invention to arch the non-skid flanges in such a manner that the apexes thereof will be disposed circumferentially midway between opposite traction flanges of adjacent sections so that when the wheel is revolving the equally disposed apexes touching the ground will uniformly support the wheel and thereby eliminate jars and jolts. In this connection, it is a feature of the invention to have the non-skid and traction flanges of uniform radial height.

In this novel construction, where each unit has only one traction flange at one end thereof, it is a feature to arch the non-skid flanges somewhat off center with respect to their length and with respect to the length of the section, and disposing the apex toward that end remote from the traction flange, a sufficient distance to locate such apex midway between the traction flanges.

It is a further object of this invention to provide tread sections of skeleton form, the said skeleton members being united with each other and with the traction and non-skid flanges in such a manner as to form an extremely rigid frame for the sections and greatly reduce the weight thereof as compared to tread sections of solid formation.

It is a further object of this invention to pivotally unite the tread sections with each other in end to end relation circumferentially about the wheel tread, each section having at one end thereof a pair of retaining arms embracing lateral portions of the wheel tread and extending radially inwardly therealong from the tread sections. It is a feature to connect the arms of adjacent tread sections by means of links whereby the retaining feature will be rendered more effective.

It is a further feature of this invention to provide novel means for tightening and retaining the tread sections in position on the wheel tread.

A further feature consists in forming the tread sections in such a manner that they may be readily folded or collapsed with the sections in superimposed relation.

Other features and objects will be more fully described in connection with the accompanying drawings and will be more particularly pointed out in and by the appended claims.

In the drawings:—

Figure 1 is a view in side elevation of a portion of a wheel showing the improved device in position thereon.

Figure 2, is an enlarged plan view of one complete section and a portion of another, looking down on the same.

Figure 3, is a bottom plan view of one of the sections.

Figure 4, is a transverse sectional view on line 4—4 of Figure 2.

Like characters of reference designate similar parts throughout the different figures of the drawings.

Figure 5:
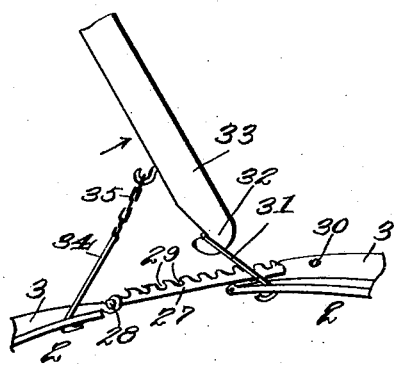
Figure 5, is a view of the means for tightening the device.

As illustrated, 1 designates any form of tire to which the device of the invention may be applied. Our device consists of a series of transversely arched or curved tread sections 2, each section having one or more longitudinally disposed projecting flanges 3 and 4, to prevent side skidding and each section also having at only one end thereof, a transversely disposed traction flange. As will later appear in the more specific description, the flanges are centrally disposed with respect to the width of the section, the flanges 4 being laterally arranged on opposite sides of the flanges 3. One of the important features of the invention is that the radially highest or apex point of each flange 3 is midway between opposite traction flanges 5, circumferentially of the wheel. Therefore, on a hard surface, and with these projecting portions 3 and 5 of the same radial height, as they are, and which is also a feature, the vehicle will not be subjected to a series of jars and jolts as the wheel revolves. Of course, on a soft road surface all the flanges would sink in to a certain extent wholly dependent upon the character of the road. It will be seen that in a soft road, the transversely extending traction flanges 5 will be extremely effective in lending traction and preventing the wheel from spinning.

I will next refer more particularly to the manner in which the sections are fabricated, reference being had more particularly to Figures 2 to 4.

Each section 2 is composed of a skeleton frame including longitudinally disposed frame strips 6 and a transversely disposed frame strip 7, secured to the longitudinal strip 6 by any suitable means such as rivets 8. The remaining ends of the strips 6 are secured by rivets 9 to a transversely disposed retaining arm forming strip 10, thereby forming a rigid skeleton frame structure of a strength greatly in excess and in flexibility as compared to a solid tread section of the same weight. The ends of the strip 10, as shown at 11 project radially inwardly and serve to embrace the tread of the wheel as shown in Figures 1 and 4, the latter being shaped more especially in accordance with a solid truck tire. Links 12 are pivoted to each other at 13, and are pivoted at 14 to the arms 11, and serve to connect the arms of adjacent sections. One of the functions of this part of the structure is to stabilize and help to stiffen the traction flanges 5 when the latter are under great traction stress, as will be clear from reference to Figure 1. A further feature of this part of the structure is to serve as a retainer to embrace the sides of the tread and thereby serve to prevent the tread sections from slipping off from the tire laterally. At suitable intervals, straps 15 may be employed to extend about the felly 16, although this is not a claimed feature of the invention.

We will next describe the construction and disposition of the non-skid and traction flanges.

Flange 3 is mounted upon the middle strip 6 and is provided with a base flange 17 of a greater length than the flange 3, one end of said flange 17 being secured by one of the rivets 8, to the strip 7, and the other end being secured by one of the rivets 9. Throughout its length between said rivets the flange 17 rests upon middle strip 6. Flanges 4 each have similar base flanges 18, resting on outer strips 6 and having their ends secured by rivets 8 and 9 thereby further strengthening the skeleton frame section. The traction flange 5 has a base flange 19 which is superimposed upon the ends of flanges 17 and 18 and is secured by rivets 9. Thus the strip 10 is interposed and secured between the ends of strip 6, the flanges 17 and 18 and the flange 19, thereby giving the traction flanges a very secure anchorage structure at their end of each section. Furthermore, this construction strengthens the strip 10 in such a manner as to lend greater rigidity to arms 11. It will now be clear how the connected arms 11 serve to stiffen the traction flanges against being tilted under heavy traction stress.

Adjacent ends of the sections are provided with butts 20 and 21 through which pintles 22 and 23 extend and from which they are withdrawable. A link 24 is provided with butts 25 and 26 whereby the tread sections may be pivotally united in end to end relation. The link 24 is of sufficient length so that when it is folded up along side of the traction flange 5, it will permit one section to fold over in superimposed relation with the companion section, as shown in the collapsed figure. This is a special feature of the invention.

Figure 6:
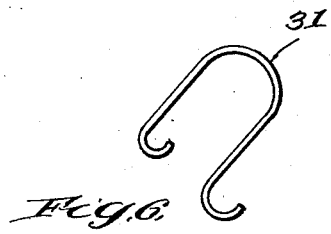
Figure 6, is a perspective view of one of the links used in tightening the device.
Figure 7:
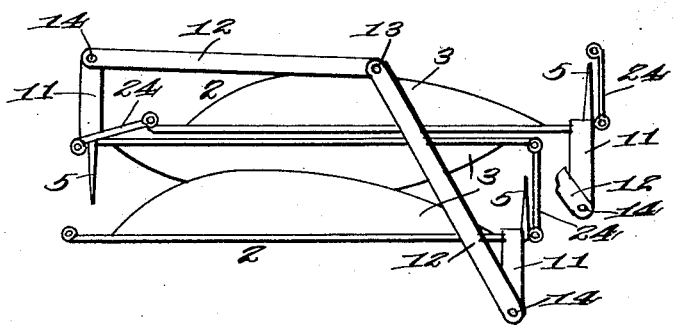
Figure 7, is a view showing how the sections can be folded in superposed relation.

Reference will next be made to the manner in which the sections are drawn taut, reference being had more particularly to Figures 5 and 6.

On one end-most section is a connecting bar 27 which may be pivoted to the butts 20 by a pintle 28. The bar has notches 29, any one of which may engage with a pin 30, on a flange 3 of the remaining end-most section. A bail 31 may be extended about the hooked end 32 of a lever 33. The terminal ends of the bail may be hooked into the skeleton structure of one end-most section. A similar bail 34, connected by a suitable chain 35 with said lever will serve to draw the sections together when the lever is moved in the direction of the arrow.

It is believed that the device of this invention will be fully understood from the foregoing description, and while we have herein shown and described one specific form of our invention, we do not wish to be limited thereto except for such limitations as the claims may import.

We claim:—

1. A traction and non-skid device for wheels, comprising a series of transversely curved tread sections, links connecting said sections and disposed along the tread of the wheel whereby the device may be held taut on the tread, one end of each section having a retaining arm extending radially inwardly alongside the tire, and links connecting alternate adjacent arms, leaving alternate adjacent arms unconnected.

2. A traction and non-skid device for wheels, comprising a series of transversely arched tread sections, each section having a non-skid flange extending lengthwise thereof and each section having a transversely disposed traction flange at one end thereof, the apices of said non-skid and traction flanges being equally spaced apart circumferentially and of the same radial height thereby reducing jolting vibration as the vehicle wheel turns.

3. A traction and non-skid device for wheels, comprising a series of connected and transversely arched tread sections, each section having a longitudinally disposed non-skid flange, a transversely disposed traction flange on only one end of each section, each non-skid flange being arched to dispose its apex circumferentially mid-way between the traction flange of its section and the traction flange of the next adjacent section.

4. A traction and non-skid device for vehicle wheels comprising a series of skeleton and transversely arched sections each comprising longitudinally disposed frame strips, a transverse frame strip connected with said longitudinal frame strips at one end of the section, a retaining arm forming strip connected with said longitudinal strips at the other end of said section and having its ends extending radially inwardly of the wheel tread to form retaining arms, longitudinally disposed non-skid flanges having base flanges superimposed on said longitudinal frame strips and secured to the frame at opposite ends, and a transversely disposed traction flange having a base flange superimposed on and secured to said retaining arm forming strip.

5. A foldable non-skid and traction device for vehicle wheels, comprising a series of sections each having non-skid flanges and each section having a traction flange at one end thereof, and links pivotally connecting said sections and each link being of sufficient excess length with respect to the height of the adjacent traction flange to extend above the latter when folded thereby permitting one section to be folded in superposed relation with respect to the next section.

In testimony that we claim the foregoing as our own, we hereby affix our signatures.

AUGUST JOHNSON.
OSCAR LANDHOLM